Sept. 4, 1962
A. E. ROLLER
3,052,435
VIBRATION DAMPING AND SHOCK ABSORBING
RESILIENT ENGINE MOUNTING
Filed Dec. 19, 1960
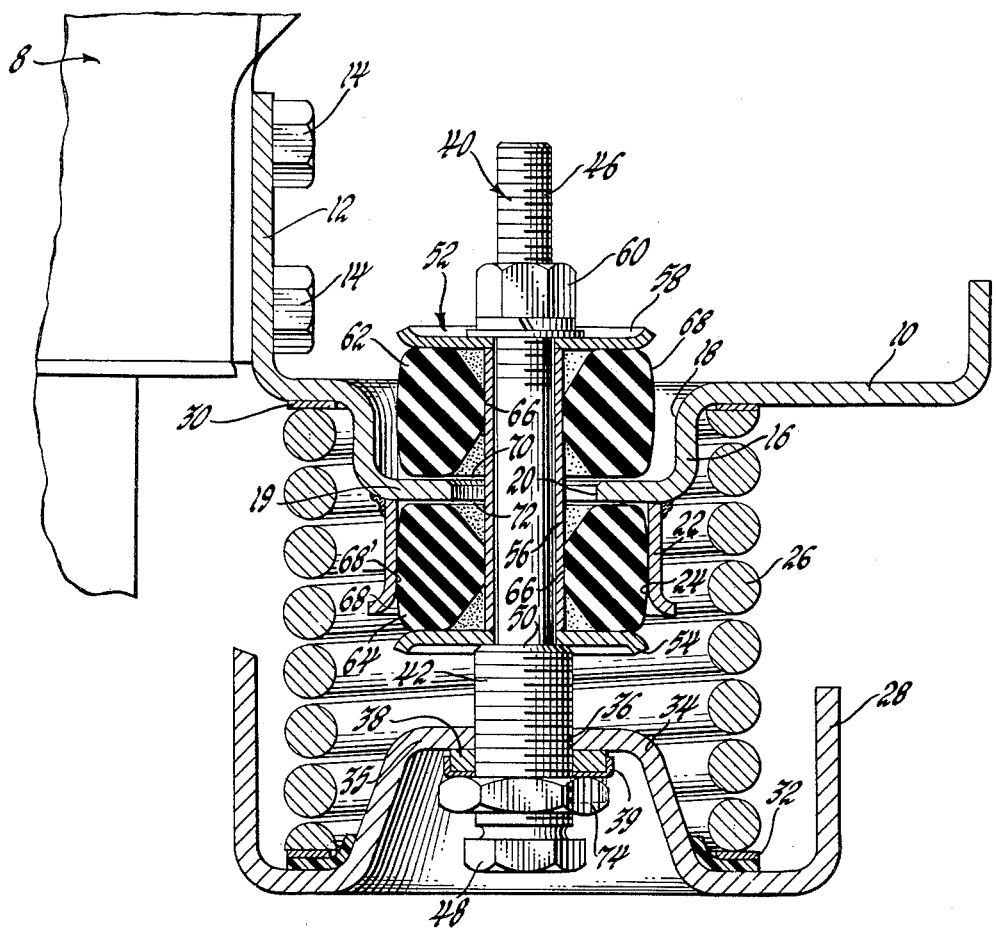
INVENTOR.
Albert E. Roller
BY
E. E. James
ATTORNEY

United States Patent Office 3,052,435
Patented Sept. 4, 1962

3,052,435
VIBRATION DAMPING AND SHOCK ABSORBING RESILIENT ENGINE MOUNTING
Albert E. Roller, Birmingham, Mich., assignor to General Motors Corporation, Detroit, Mich., a corporation of Delaware
Filed Dec. 19, 1960, Ser. No. 76,684
12 Claims. (Cl. 248—8)

This invention relates to a resilient mounting device constituting a vibration damping and shock absorbing connection between a supporting and supported structure and having particular application in supporting an internal combustion engine within the frame of a motor vehicle.

The invention contemplates an improved and relatively simple resilient engine mounting which is of economical easily assembled construction, which is adjustable to provide desired variable rate rebound characteristics obtaining optimum vibration damping and mounting life and which is particularly adapted to isolate and damp the vibration and torsional reactions of the engine from transmission to the vehicle frame and body while at the same time isolating the engine housing from road shocks and from resultant twisting of the vehicle frame thereby improving the riding qualities of the motor vehicle and contributing to passenger comfort by reducing the amount of engine vibration and road shock transmitted through the vehicle frame and body.

The foregoing and other objects, advantages and features of the invention will be apparent from the following description, having reference to the single FIGURE of the accompanying drawing showing an engine mounting device illustrative of the invention in transverse section.

In the drawing, the frame of an internal combustion engine is partially shown and indicated by the reference numeral 8. An upstanding flange 12 of an engine supporting bracket member 10 is secured by bolts 14 to the side face of the engine frame member. The laterally extending base portion of this bracket member is stamped to provide a boss 16 defining a cylindrical upwardly opening recess or depression 18 having a bottom wall 19. The wall 19 is perforated to define an opening 20 extending centrally therethrough. A cylindrical sleeve 22 is welded to and cooperates with the bottom wall 19 to define a second downwardly facing cylindrical recess 24 concentrically aligned with the opening 20. The sleeve member and the boss 16 are outwardly embraced by a helical spring 26 which is compressively interposed between the engine supporting bracket 10 and a vehicle frame member 28. This spring supports the engine weight applied thereto and normally absorbs or damps all of the engine induced vibrations and torque reactions occurring within the normal range of engine operating speed. The upper end of the spring 26 engages a spring seating washer 30 which in turn engages the base portion of the bracket member 10 outwardly of the boss 16. A resiliently backed washer member 32 is interposed between the lower end of the spring 26 and the lower bottom wall of the frame member and embraces an upwardly projecting cylindrical or frusto-conical boss 34 stamped therein.

The upper wall 35 of the frame boss 34 has a central tapped opening 36 therethrough and is reinforced in assembly by a nut 38 nonrotatably secured to its underside by welding a locking strip 39. A bolt or stud 40 of stepped diameter has a large diameter lower portion 42 which is screw threaded in the coextensive threads of the nut 38 and of the opening 36. An intermediate reduced diameter and unthreaded shank portion of the bolt extends upwardly through the opening 20 in the upper bracket member 10. The end of the bolt 40 projecting above the bracket 10 is of substantially the same diameter as the shank portion and is externally threaded as indicated at 46. The lower end of the bolt 40 is provided with a hexagonal head 48 for the purpose of turning the bolt in assembly and in adjustment of the mounting device. The large diameter and shank portions of the bolt define an annular shoulder 50 which is engaged by one end of a spool assembly 52 mounted on the reduced diameter shank portion of the bolt. This spool assembly comprises two end flange defining disk or washer members 54 and 58 which are maintained in spaced parallel relation to each other and to the oppositely disposed ends of the bracket defined recesses 18 and 24 by an intermediate spacer sleeve 56. These spool defining elements are clamped together on the bolt by a nut 60 which is threadably tightened and suitably locked on the upper bolt portion 46.

In assembly, two resilient rebound limiting grommets or bushings 62 and 64 are mounted on the spacer sleeve of the spool assembly within the bracket defined recesses 18 and 24. These rebound grommets are interchangeable and formed of rubber or like resilient material. Each grommet is beveled inwardly from its opposite ends to an inner surface 66 of reduced axial dimension. These reduced inner grommet surfaces and portions frictionally embrace and resiliently snub the spacer sleeve. The outer surfaces 68 of the grommets are convex longitudinally thereof. To provide the mounting device with desired directional stability and lateral rebound characteristics, the convex outer surface of the lower grommet 64 frictionally and resiliently engages the inner surface of the recess defining sleeve 22 at 68'. In the illustrative embodiment, the recess defining side wall of the upper bracket boss 16 spacedly embraces the upper grommet 62 and is resilient engageable thereby only under conditions of extreme lateral movement between the engine and frame. The relative axial dimensions of the spacer sleeve and of the rebound limiting grommets provide static assembled clearances 70 and 72 between the recess defining bottom wall 19 and the upper and lower grommets 62 and 64, respectively. These clearances are preferably equalized by threadable adjustment of the spool carrying bolt relative to the frame member to permit limited substantially free vertical deflection of the coil spring 26 in either direction before the bracket bottom wall 19 engages either grommet and compressive rebounding thereof occurs. Such clearance equalizing adjustment is maintained by a lock nut 74 threadably tightened into locking engagement with a lock strip 39. As shown in broken lines, the lock strip is provided with at least one tab which is subsequently bent into locking contact with one of the flat side faces of the nut 74.

The engine supporting spring 26 is preferably selected to provide a low deflection rate characteristic having a natural frequency occurring between the engine cranking and idle speeds, that is having a natural frequency which is not in resonance with the vibration inducing, engine unbalance secondary forces occurring within a normal range of engine operating speed. This spring rate selection and the clearances 70 and 72 provided between the bracket bottom wall 19 and the rebound grommets permit the vibration inducing unbalance forces to be absorbed or damped by vertical oscillation of the engine mass on the coil springs within the grommet defined limits and by the resultant and supplemental in-shear, variable rate deflections of the rebound grommets. Such vibration damping oscillations occur at twice the engine rotational speed.

From the foregoing description of a preferred illustrative embodiment, it will be seen that the invention provides an improved resilient mounting of the type described and that various modifications and changes might be made therefrom without departing from the spirit and scope of the invention as defined in the following claims.

I claim:

1. A resilient vibration and shock isolating device for mounting an internal combustion engine in a motor vehicle, said engine mounting device comprising a vehicle frame member, an engine supporting bracket member spaced from said frame member, said bracket member defining opposed axially aligned cylindrical recesses separated by a common end wall having an opening therethrough centrally of said recesses, said frame member having a threaded opening substantially in axial alignment with the opening of said bracket member, a bolt threadably mounted adjacent one end thereof within the threaded opening of said frame member and extending through the opening in said bracket member, a coil spring interposed between said support and bracket member in spaced embracing relation to said bolt and supporting the weight of the engine applied thereto, said spring having a low deflection rate and a natural resonant frequency within the engine cranking and idle speeds, a spool assembly mounted on said bolt comprising two end washers and an intermediate spacer sleeve, means for maintaining said spool assembly in axially fixed relation on the bolt, and two resilient grommets frictionally and resiliently embracing said spool assembly sleeve and interposed between said washers and said bracket end wall within said bracket defined recesses, at least one of said grommets peripherally engaging the cylindrical surface of its mounting recess and said grommets being of axial dimensions to provide predetermined clearances between said spool assembly washers and said bracket member end wall under static load conditions, and said bolt and spool assembly being axially adjustable by rotation of said bolt member relative to the threaded opening of said frame member to provide said predetermined clearances between said grommets and said bracket member end wall.

2. In a vibration isolating mount as set forth in claim 1, each of said grommets being beveled inwardly from the opposite axial ends thereof to an inner surface of reduced axial dimension in resilient frictional engagement with said spacer sleeve whereby said recess engaging grommet provides variable rate lateral compressive rebound stability to the mount and is subjected to and provides initial variable rate vibration damping deflection supplementing the axial vibration damping deflection of said spring within the rebound limits established by the static load clearances provided between said grommets and end wall, both of said grommets being subjected to and providing variable rate vibration damping deflection and compressive rebound supplementing vibration damping coil spring deflection beyond the rebound limits established by the static load clearances.

3. A resilient vibration and shock isolating device for mounting an internal combustion engine in a motor vehicle, said engine mounting device comprising a vehicle frame member, an engine supporting bracket member spaced from said frame member, said bracket member defining opposed axially aligned cylindrical recesses separated by a common end wall, and having an opening centrally therethrough of said opposed recesses, said frame member having a threaded opening therethrough in substantially axial alignment with the opening of said bracket member, a bolt threadably mounted adjacent one end thereof within the threaded opening of said frame member and extending through the opening in said bracket member, a coil spring interposed between said support and bracket member in spaced embracing relation to said bolt and supporting the weight of the engine applied thereto, said spring having a low deflection rate and a natural resonant frequency within the engine cranking and idle speeds, a spool assembly mounted on said bolt comprising two end washers and an intermediate spacer sleeve, means for maintaining said spool assembly in axially fixed relation on the bolt, and two resilient grommets frictionally and resiliently embracing said spool assembly sleeve and interposed between said washers and said bracket end wall within said bracket defined recesses, one of said grommets peripherally engaging the cylindrical surface of its mounting recess and the other of said grommets being spaced radially inwardly of the cylindrical surface defining its mounting recess, said grommets being of axial dimensions to provide predetermined clearances between said spool assembly washers and said bracket member end wall under static load conditions and said bolt and spool assembly being axially adjustable by rotation of said bolt member relative to the threaded opening of said frame member to provide said predetermined clearances between said grommets and said bracket member end wall, each of said grommets being beveled inwardly from the opposite axial ends thereof to an inner surface of reduced axial dimension in resilient engagement with the spool assembly sleeve whereby said one grommet provides initial lateral variable rate compressive rebound stability to the mount and is subjected to and provides initial variable rate vibration damping deflection supplementing the vibration damping deflection of said spring within the rebound limits established by the static load clearances provided between said grommets and end wall, said other grommet being subjected to and providing additional variable rate lateral rebound stability to said mount under extreme lateral load conditions, and both of said grommets being subjected to and providing variable rate vibration damping deflection and compressive rebound supplementing vibration damping spring deflection beyond the rebound limits established by the static clearances.

4. A resilient vibration and shock isolating mounting device comprising two support members spaced from each other and subjected to relative vibration inducing forces acting therebetween, one of said members having opposed axially aligned cylindrical recesses separated by a centrally perforated end wall, the other of said members having a threaded opening therethrough in substantially axial alignment with the perforated opening through the end wall of said one member, a coil spring interposed between said support members and supporting weight applied thereto, said spring having a natural resonant frequency below the normal frequency range of said vibration inducing forces, a spool assembly comprising an intermediate portion extending through said end wall opening between two end flanges spaced axially of said opposed recesses and further comprising a support portion threadably mounted within said threaded opening for axial adjustment of said spool assembly relative to said other member, and two resilient grommets frictionally and resiliently embracing said intermediate spool portion within said recesses, said grommets being of axial dimensions providing predetermined clearances between said spool end flanges and said recess defining end wall under static load conditions and said spool assembly being adjustable by rotation of its threaded support portion relative to the threaded opening of said other member to provide said predetermined clearances between said grommets and said end wall and spool flanges, one of said grommets peripherally engaging the cylindrical surface defining its mounting recess, and the other of grommets being spaced radically inwardly of cylindrical surface defining its mounting recess.

5. In a vibration isolating mount as set forth in claim 4, each of said grommets being beveled inwardly from the opposite axial ends thereof to an inner surface of reduced axial dimension in resilient engagement with the intermediate portion of said spool whereby said one grommet provides initial lateral variable rate compressive rebound stability to the mount and is subjected to and provides initial variable rate vibration damping deflection supplementing the vibration damping deflection of said spring within the rebound limits established by the static load clearances provided between said grommets and end wall, said other grommet being subjected to and providing additional variable rate lateral rebound stability to said mount under extreme lateral load conditions, and both of said grommets being subjected to and providing variable rate vibration damping deflection and compressive rebound supplementing vibration damping spring deflection beyond the rebound limits established by the static clearances.

6. A resilient vibration isolating mounting device comprising two support members spaced from each other, at least one of said members being subjected to vibration inducing forces, a coil spring interposed between said support members and supporting weight applied thereto, said spring having a natural resonant frequency below the normal frequency range of said vibration inducing forces, one of said members having opposed axially aligned cylindrical recesses separated by a centrally perforated end wall, a spool assembly comprising an intermediate spool portion extending through the perforated opening in said end wall between two spool end flanges spaced axially of said opposed recesses and a spool support portion adjustably mounted on said other member, two resilient grommets frictionally and resiliently embracing said intermediate spool portion within said recesses, said grommets being of axial dimensions providing predetermined clearances between said spool end flanges and said recess defining end wall under static load conditions and said spool support portion being adjusted axially of said other member to provide said predetermined clearances between said grommets and said end wall and spool end flanges, and at least one of said grommets peripherally and resiliently engaging the cylindrical surface defining its mounting recess.

7. In a vibration isolating mount as set forth in claim 6, each of said grommets being beveled inwardly from the opposite axial ends thereof to an inner surface of reduced axial dimension in resilient engagement with said intermediate spool portion whereby said one grommet provides lateral variable rate compressive rebound stability to the mount and is subjected to and provides axial variable rate vibration damping deflection supplementing the vibration damping deflection of said spring within the rebound limits established by the static load clearances provided between said grommets and end wall, both of said grommets being subjected to and providing variable rate vibration damping deflection and compression supplementing vibration damping deflection of said spring beyond the rebound limits established by the static load clearances.

8. A vibration isolating mount comprising two support members spaced from each other, at least one of said members being subjected to vibration inducing forces, a spring normally supporting the mounted weight applied between said support members and having a resonant frequency below the normal frequency range of said vibration inducing forces, one of said members having a recess therein terminating in a perforated end wall, a spool comprising an intermediate spool portion and two spool end flanges, said intermediate spool portion extending through the perforation in said end wall between the two end flanges axially spaced on opposite sides of said end wall, means for adjustably mounting said spool for axial movement on said other member, two resilient grommets frictionally and resiliently embracing said intermediate spool portion, one of said grommets being mounted within said recess and peripherally and resiliently engaging the surface thereof, said grommets being of limited axial dimensions and said spool being adjusted axially by its mounting means relative to said other member to provide predetermined clearances between said grommets and said end wall under static load conditions.

9. In a vibration isolating mount as set forth in claim 8, each of said grommets being beveled inwardly from at least the adjacent axial ends thereof to an inner surface of reduced axial dimension in resilient engagement with said intermediate spool portion whereby said one grommet provides lateral variable rate compressive rebound stability to the mount and is subjected to and provides axial variable rate vibration damping deflection supplementing the vibration damping deflection of said spring within the rebound limits established by the static load clearances provided between said grommets and end wall, both said grommets being subjected to and providing variable rate vibration damping deflection and compression supplementing vibration damping deflection of said spring beyond the rebound limits established by the static load clearances.

10. A vibration isolating mount comprising two support members spaced from each other, at least one of said members being subjected to vibration inducing forces, a spring normally supporting the mounted weight applied between said members and having a resonant frequency below the normal frequency range of said vibration inducing forces, one of said members having an opening therethrough, a spool mounted on the other of said members comprising an intermediate spool portion extending between two end flanges, said intermediate spool portion extending through said opening and spacing said end flanges axially on opposite sides of said one member, two resilient grommets frictionally and resiliently embracing said intermediate spool portion and having predetermined clearances with the opposite sides of said one member under static load conditions, each of said grommets being beveled inwardly from at least the adjacent axial ends thereof to an inner surface of reduced axial dimension in resilient engagement with the intermediate spool portion thereby providing initially soft variable rate vibration damping deflection and compression of said grommets supplementing vibration damping deflection of said spring beyond the rebound limits established by the static load clearances between said grommets and said one member.

11. A resilient vibration and shock isolating device for mounting an internal combustion engine in a motor vehicle, said engine mounting device comprising a vehicle frame member, an engine supporting bracket member spaced from said frame member, said frame and bracket members having cylindrical bosses thereon extending in substantial parallel axial alignment to each other and defining opposed parallel end walls, said frame member boss having a threaded opening centrally of the end wall thereof, said bracket member end wall having a central opening therethrough in substantially axial alignment with the threaded opening of said frame member, a bolt member of stepped diameter threadably mounted adjacent one end thereof within the threaded opening of said frame member, said bolt member having a reduced diameter shank portion defining a shoulder with said one end and extending therefrom through the opening in said bracket member and being threaded at its opposite end, a coil spring compressively interposed between said support and bracket member in spaced embracing relation to said bolt member and to said bracket member defined bosses, said spring supporting the weight of the engine applied thereto and having a low deflection rate characteristic and a natural resonant frequency within the engine cranking and idle speeds, a spool assembly mounted on said bolt member comprising two end washers and an intermediate spacer sleeve maintaining said washers in fixed axially spaced relation on the bolt, a nut member threadably mounted on the opposite end of said bolt member and abutting the adjacent washer member to maintain the opposite washer member in abutment with the bolt defined shoulder, and two resilient grommets frictionally and resiliently embracing said spacer sleeve and interposed between said washers and said bracket member adjacent the opening therethrough, said grommets being of limited axial dimensions and said bolt and spool assembly being adjusted by rotation of said bolt member to provide predetermined clearances between said grommets and said bracket member under static load conditions.

12. A resilient vibration and shock isolating device for mounting an internal combustion engine in a motor vehicle, said engine mounting device comprising a stamped vehicle frame member, a stamped engine supporting bracket member spaced from said frame member, said frame and bracket members having cylindrical bosses thereon extending in substantial parallel axial alignment to each other and defining opposed parallel end walls, said frame member end wall having a threaded opening centrally therethrough and said bracket member end wall having a central opening therethrough in substantially axial alignment with the threaded opening of said frame member, a sleeve member secured to said bracket member end wall and cooperating therewith to define a cylindrical recess oppositely disposed to that formed by said bracket member boss, a bolt member of stepped diameter threadably mounted adjacent one end thereof within the threaded opening of said frame member, said bolt member having a reduced diameter shank portion defining a shoulder with said one end and extending therefrom through the opening in said bracket member and being threaded at its opposite end, a coil spring compressively interposed between said support and bracket member in spaced embracing relation to said bolt member and to said bracket member defined bosses, said spring supporting the weight of the engine applied thereto and having a low deflection rate characteristic and a natural resonant frequency characteristic lies within the engine cranking and idle speeds, a spool assembly mounted on said bolt member comprising two end washers and an intermediate spacer sleeve maintaining said washers in fixed axially spaced relation on the bolt, a nut member threadably mounted on the opposite end of said bolt member and abutting the adjacent washer member to maintain the opposite washer member in abutment with the bolt defined shoulder, and two resilient grommets frictionally and resiliently embracing said spacer sleeve and interposed between said washers and said bracket end wall within said bracket defined recesses, one of said grommets peripherally engaging the cylindrical recess defining surface of said bracket sleeve and the other of said grommets being spaced radially inwardly of the cylindrical recess defining surface of said bracket boss, said grommets being of limited axial dimensions and said bolt and spool assembly being adjusted by rotation of said bolt member to provide predetermined clearances between said grommets and said bracket member under static load conditions, each of said grommets being beveled inwardly from the opposite axial ends thereof to an inner surface of reduced axial dimension in resilient engagement with the spool assembly sleeve whereby said one grommet provides initial lateral variable rate compressive rebound stability to the mount and is subjected to and provides initial variable rate vibration damping deflection supplementing the vibration damping deflection of said spring within the rebound limits established by the static load clearances provided between said grommets and end wall, said other grommet being subjected to and providing additional variable rate lateral rebound stability to said mount under extreme lateral load conditions, and both of said grommets being subjected to and providing variable rate vibration damping deflection and compressive rebound supplementing vibration damping spring deflection beyond the rebound limits established by the static clearances.

References Cited in the file of this patent
UNITED STATES PATENTS

| | | |
|---|---|---|
| 1,176,934 | Taylor | Mar. 24, 1916 |
| 1,660,671 | Gurney | Feb. 28, 1928 |
| 1,833,424 | Jansson | Nov. 24, 1931 |
| 1,968,040 | Houdek | July 31, 1934 |
| 2,270,335 | Parkinson | Jan. 20, 1942 |
| 2,869,811 | Boschi | Jan. 20, 1959 |